United States Patent [19]
Condit et al.

[11] 3,883,819
[45] May 13, 1975

[54] APPARATUS FOR UNIFORM PUMPING OF LASING MEDIA

[75] Inventors: William C. Condit; Samuel F. Eccles, both of Livermore, Calif.

[73] Assignee: The United States of America as represented by the United States Energy Research and Development Administration, Washingtion, D.C.

[22] Filed: May 23, 1974

[21] Appl. No.: 472,928

Related U.S. Application Data

[63] Continuation-in-part of Ser. No. 315,261, Dec. 14, 1972, abandoned.

[52] U.S. Cl. ............ 331/94.5 PE; 330/4.3; 315/3.5
[51] Int. Cl. ............................................. H01s 3/09
[58] Field of Search .................. 331/94.5; 330/4.3; 315/3.5

[56] References Cited
UNITED STATES PATENTS

| | | | |
|---|---|---|---|
| 3,702,973 | 11/1972 | Daugherty et al. | 331/94.5 |
| 3,729,689 | 4/1973 | Godard et al. | 331/94.5 |

OTHER PUBLICATIONS

Bogdankevich et al., *Int'l Aerospace Abstracts*, abstr. no. A71-28858; July 1, 1971.

Mobley, *The Review of Scientific Instruments*, vol. 34, no. 3, March, 1963, pp. 256–264.

Miley, *Eleventh Symposium on Electron, Ion & Laser Beam Technology*, Boulder, Colo., 5/11/71, pp. 279–290.

*Primary Examiner*—Robert J. Webster
*Attorney, Agent, or Firm*—Dean E. Carlson; F. A. Robertson; L. E. Carnahan

[57] ABSTRACT

Electron beam pumping of gaseous or liquid lasing media is carried out by means of electron pulses generated by an electron accelerator. Between the accelerator and the laser cavity, the electron pulse is subjected to a magnetic field to turn the electron pulse approximately through a quarter orbit, so that in essence the direction of pulse travel is changed from axial to lateral. This procedure then enables pumping of the laser cavity uniformly and simultaneously, or in any desired traveling wave mode, over the entire length of the laser cavity with relatively short, and highly intense, electron pulses.

10 Claims, 1 Drawing Figure

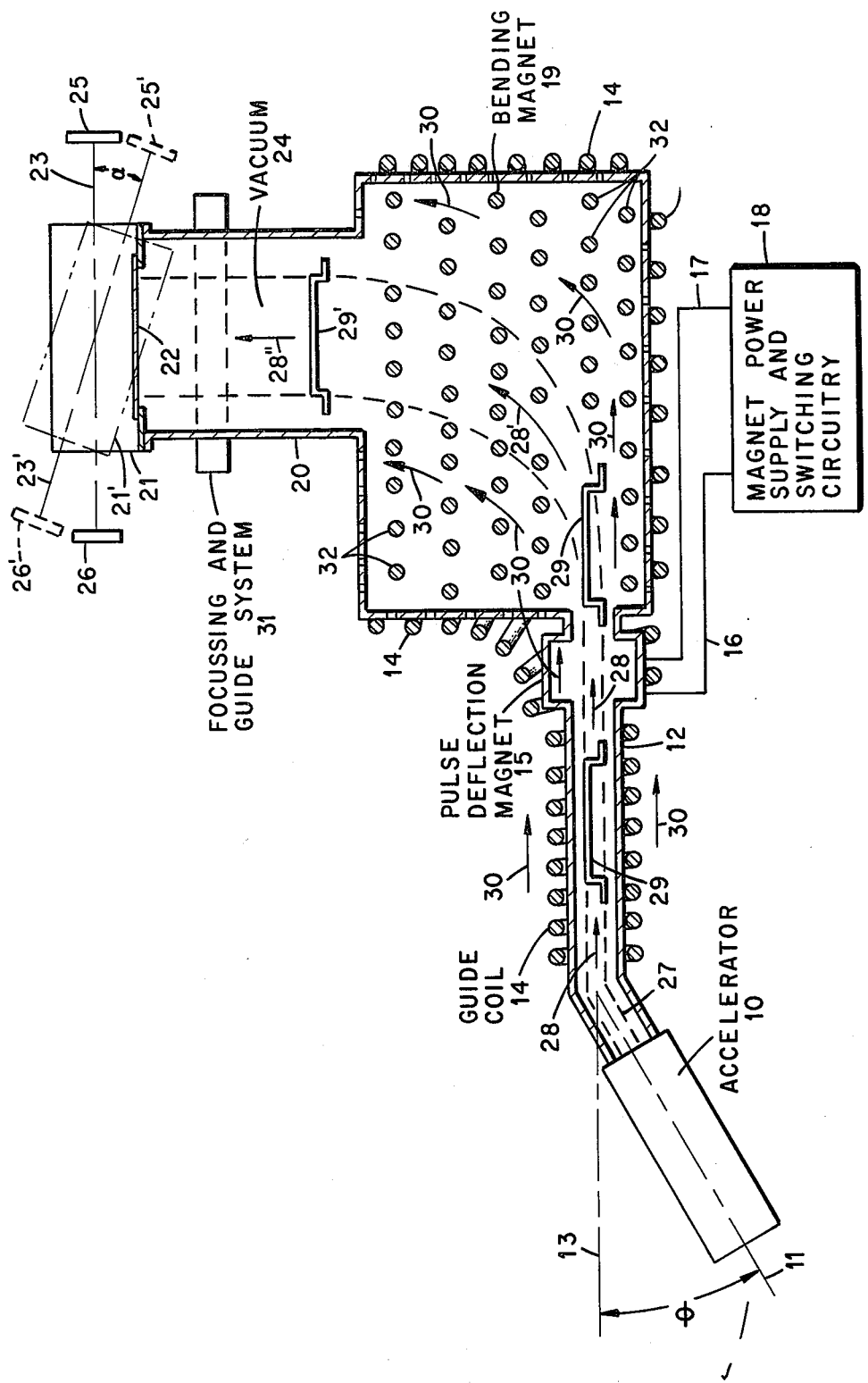

APPARATUS FOR UNIFORM PUMPING OF LASING MEDIA

The invention described herein was made in the course of, or under Contract No. W-7405-ENG-48 with the United States Atomic Energy Commission.

RELATED APPLICATION

This application is a continuation-in-part of application Ser. No. 315,261 filed Dec. 14, 1972, and now abandoned.

BACKGROUND OF THE INVENTION

This invention relates to lasers, particularly to electron beam pumping of gaseous or liquid lasing media, and more particularly to electron beam pumping of gaseous or liquid lasing media by electron pulses generated by an electron accelerator.

It is known that electron beams can excite or "pump" lasing media, as exemplified by U.S. Pat. No. 3,641,454 issued Feb. 8, 1972 to B. Krawetz and an article by O. V. Bogdankevich et al., published in International Aerospace Abstracts, Abstract No. A71-28858, July 1, 1971. Also, it is known that electron beams can aid in control of electrical discharges in lasing media, as exemplified by the above-cited Krawetz patent and U.S. Pat. No. 3,702,973, issued Nov. 14, 1972 to J. D. Daugherty et al.

In general, the useful gain for forming the output beam from a lasing medium depends on the concentration of excited species present in the medium and available for stimulating photon emission therefrom. This concentration is built up by absorption of energy from a pumping source, such as flash lamps, electron beams, etc. The useful power density available from conventional pump sources such as flash lamps is usually small (in pulsed lasers) compared to the laser beam output power; consequently, the length of time required for pumping is considerably longer than the duration of the laser flash. (This does not apply to continuous wave (CW) lasers which are normally very low power devices). This energy transfer is somewhat analogous to the slow charging and sudden discharging of capacitors.

At this point, it is important to realize that the time interval available for pumping is limited because of losses associated with spontaneous emission, which depletes the concentration of excited species. One known approach to this problem is to pump the laser medium at the speed of light (or approximately so), as exemplified by U.S. Pat. No. 3,729,689 issued Apr. 24, 1973 to B. Godard et al., just ahead of the stimulating pulse, or in the presence of the stimulating radiation, which effectively reduces the effect of losses due to spontaneous emission, i.e., by allowing little or no time for spontaneous emissions to occur. This has been achieved previously with electric discharge pumping of lasers, but not with electron beam pumping. In some circumstances, fast-decaying laser systems such as Xenon gas are of interest; however, because little or no time is available to pump such systems, the ability to accumulate high concentrations of excited species by pumping with prior art sources is severely limited. The limiting consideration in this case is thus the pump source's power density. While obvious in the case of flash lamps, these same considerations also apply to electron beam-pumped devices.

SUMMARY OF THE INVENTION

The present invention is directed to an apparatus for uniform pumping of lasing media with short and intense electron pulses which includes the following aspects:

1. It provides the use of existing and conventional electron accelerators as a pump source for lasers, by means of compressing their pulses in time, which represents a significant step in increasing the intensity of laser pumping; and
2. It provides a method for pumping the laser cavity essentially, instantaneously or in any desired traveling wave mode in a previously unrecognized way.

Therefore, it is an object of this invention to provide a laser media pumping apparatus.

A further object of the invention is to provide an apparatus which utilizes an electron accelerator for pumping a laser.

Another object of the invention is to provide means for pumping a laser cavity instantaneously.

Another object of the invention is to provide an apparatus which enables pumping a laser cavity uniformly and simultaneously, or in any desired traveling wave mode, over the entire length of the laser cavity with relatively short, and highly intense, electron pulses.

Other objects of the invention will become readily apparent from the following description and accompanying drawing.

BRIEF DESCRIPTION OF THE DRAWING

The single FIGURE schematically illustrates an embodiment.

DESCRIPTION OF THE INVENTION

Prior to the specific description of the illustrated embodiment of the invention the following general description of the inventive concept is set forth to provide a greater understanding of the significant advance in the state of the art provided by this invention.

Linear accelerators are known in the art and function as a source of electron pulses. Basically, any electron accelerator could be used to pump laser media in accordance with the present invention; however, since the parameter of particular interest is electron current, high beam current machines are preferred. As will be more apparent from the following discussion of the bending magnets, the desired electron pulse length is related to the laser cavity dimensions. Spatially, the electron pulse occupies a cylindrical volume whose length is given by the product of the electron velocity and the pulse temperal duration.

The energy of the electrons (and therefore their velocity) is largely determined by the nature of the laser medium to be pumped. This accelerator output parameter is therefore adjusted to fit within appropriate limits to maximize the interaction between electron and lasing species in the cavity. Typical electron energies are 100 keV – 10 MeV, i.e., near or at relativistic velocities.

In view of the relatively high velocities, as well as practical difficulties with coincident electron beam and light beam trajectories, the laser cavity is not pumped in the axial direction. Rather, a pulsed deflecting system is turned on just before the electron pulse enters the bending field region. The purpose of the static bending field is to turn the electron pulse around to the point where it moves laterally rather than axially parallel to the laser tube axis as seen in the drawing by the change in position of the pulse wave. Where the rise time of the deflecting field is slow compared to electron transit time, this is straightforward, and the pulse is turned around in essentially a quarter or other fractional turn of the electron trajectory in the static bending field. For electron pulses whose transit times are comparable or greater than the field risetimes, the geometric dimensional relationship dimensionalrelationship require modification, but are clearly within the state of the art. This method is essentially described, for low current proton or deuteron beams, in a paper by R. C. Mobley entitled "Variable-Path Magnetic Ion Buncher", published in the Review of Scientific Instruments, 34, 1963, page 256. In the case of the present invention, the beams self-magnetic field must also be considered.

The electron pulse emerges from the bending field region with the broad-aspect profile similar to the area of pumping discharge desired in the electron discharge pumped laser systems, and then enters the laser cavity. The positioning of the laser cavity with respect to the emerging pulse front determines the pump mode, i.e., instantaneous (over the entire cavity length) when the cavity axis is parallel to the pulse front, or traveling wave mode when the cavity is at an angle with respect to the pulse front, where the traveling pump wave velocity is $v/\sin \alpha$, where v is the forward velocity of the pulse, and $\alpha$ is the angle between the cavity axis and the plane perpendicular to the direction of the electron beam motion. It should be noted that the static bending field can be supplemented with or replaced by a final focussing system.

For typical present-day linear accelerator, the spatial pulse length of a 50 ns machine will be about 50 feet. This is inconvenient for most laser systems. It is the particular intent of this invention to circumvent this by adding a third, stronger, component to the magnetic field, called herein the "guide" field, whose purpose is to wrap the electrons trajectory up into tight spirals, making the forward velocity much slower ($v = v_o \sin \theta$, where $v_o$ = electrons total velocity). The "guide" field exists, at varying strengths, between the accelerator and the laser cavity. The electrons perform tight spiral orbits around the guide field lines, these orbits being grossly directed and deflected by the bending and deflection fields. The term "forward" velocity here implies toward the lasing medium, along the guide field. Forward velocity equals the velocity vector averaged over one or many orbits of the fast circular motion. Utilization of a "guide" field is new in the buncher field and provides a novel improvement over the above-referenced buncher by R. C. Mobley.

The laser cavity has to be sealed with respect to the electron beam conduit or beam pipe, which is done by means of a window, such as 1–10 mil thick metal foil or plastic. Also, for converting the electrons into x-rays or gamma rays for irradiating the laser cavity media, high Z material-backed windows may be used.

Referring now to the drawing, the illustrated embodiment of the invention comprises a high-current accelerator such as linear electron accelerator 10 having an axis 11 and connected at one end thereof to a beam pipe 12 having an axis 13, accelerator 10 being connected to beam pipe 12 such that the respective axes form an angle $\theta$, (illustrated as being about 30°, for example, but can be from about 5° to about 85° depending on the value of $\sin \theta$ desired, as above described), which functions, if desired, to initiate the spiral trajectory of the electrons in the above-described "guide" field which is created by a guide coil 14, wrapped around beam pipe 12 and the deflection and bending magnets described hereinafter, guide coil 14 being connected to a power supply, not shown. Beam pipe 12 is connected at the opposite end from accelerator 10 to a pulsed deflection system such as a pulsed deflection magnet 15, or other suitable means, electrically connected via leads 16 and 17 to a magnet power supply and switching circuitry assembly generally indicated at 18. Deflection magnet 15 functions as known in the art. A bending magnet 19, producing a B field in a direction out of the paper, is connected to a power supply, not shown, and connected between deflection magnet 15 and a beam conduit 20, conduit 20 being connected at the opposite end to a laser cavity or vessel 21 containing a gaseous or liquid lasing medium. A window 22, of metal foil or plastic, such as Mylar, is positioned in laser cavity surface adjoining conduit 20. Laser cavity 21 is illustrated in solid lines as having an axis 23, and in phantom lines at 21' having an axis 23' which forms an angle $\alpha$ with respect to axis 23 for reasons mentioned above and further described hereinafter, angle $\alpha$ being up to about 20°, for example. As indicated at 24, the electron beam path through beam pipe 12, magnets 15 and 19, and conduit 20 is under vacuum or suitable inert gas at a low pressure. Positioned in spaced relation at opposite ends of laser cavity or vessel 21 are reflector members 25 and 26 (shown in phantom at 25' and 26' with respect to laser cavity 21') which function in conjunction with vessel 21 as an optical resonant cavity as known in the art. However, reflective members 25 and 26 may be omitted if the system is utilized as an amplifier for an incoming signal rather than as an oscillator.

In operation, a pulse or beam of electrons, uniform in time, or having a current which depends in any desired way on time, is discharged from accelerator 10 within an electron trajectory envelope indicated by the spaced pair of dash lines 27 which extends through beam pipe 12, deflection and bending magnets 15 and 19, and beam conduit 20, envelope 27 increasing in cross-section as it passes through bending magnet 19. The field lines for magnet 19 are indicated by the small circles 32. The electron pulse or beam from accelerator 10 travels through beam pipe 12 in a direction indicated by arrows 28 and has a pulse shape or width 29. Within beam pipe 12 the pulse or beam is wrapped into tight spirals by a "guide" field produced by guide coil 14 and directed through deflection magnet 15 and bending magnet 19 which functions to turn the electron pulse, as indicated by arrow 28', around to the point where it moves laterally, as indicated by the wave shape or width 29', rather than axially parallel to the laser vessel or cavity 21, the pulse being turned essentially 90° as described above. The "guide" field produced by guide coil 14 is indicated by magnetic guide field lines 30, it being understood that the electron pulse remains wrapped in spirals until it passes through bending magnet 19. The electron pulse 29' emerges from the bending field region of magnet 19 and enters beam conduit 20, as indicated by arrow 28'', with the broad aspect profile similar to the area of discharge desired in the electron discharged pumped laser systems. The pulse enter laser vessel or cavity 21 through window 22 pumping the lasing media within vessel 21. The laser vessel or cavity 21 may contain xenon at approximately 1 to 15 atmosphere pressure, for example, or any other gaseous or liquid lasing medium capable of direct excitation by electrons. Alternately it may contain auxiliary discharge electrodes, as in the above-cited Daugherty et al. patent, in which case the electrons serve merely to control the discharge. When gaseous or liquid lasing medium is contained in vessel 21, excitation of the medium by the electron pulse 26′, after passing through window 22, creates a population inversion in the lasing medium which in conjunction with reflector members 25 and 26 produce a beam of coherent radiation, or which function, without the reflector members, to amplify a beam of radiation being directed through the vessel 21, as known in the art. It being understood that the end walls of vessels 21 are transparent to the energy passing therethrough as known in the art.

The positioning of the laser cavity or vessel 21 with respect to the emerging pulse 26′ front determines the pumping mode, i.e., instananeous instantaneous the entire cavity length) when the cavity axis 23 is parallel to the pulse front due to the pulse front stricking the lasing medium simultaneously over the entire length of the pulse front, or traveling wave mode when the cavity axis 23′ is at an angle with respect to the pulse front where the traveling pump wave velocity is v/sin α, as described above due to non-simultaneous stricking of the lasing medium by the entire length of the pulse front. Uniformity of the pulses are produced when the current and voltage of said accelerator 10 are uniform in time throughout the pulse.

If desired, a final focussing and guiding system, indicated generally at 31 may be utilized, and which may, for example, be comprised of an appropriate magnetic field generating apparatus, which contains magnetic field coils which ensure that the guide field lines 30 are made to pass through the window 22 into cavity or vessel 21, care being taken not to reflect the electrons (which are performing spiral orbits around the guide lines) by the mirror effect.

It has thus been shown that the present invention provides a means for electron pumping of gaseous or liquid laser media which is carried out by means of electron pulses generated by an electron accelerator and passed through appropriate magnet fields to turn the electron pulse approximately through a quarter orbit so that in essence the direction of pulse travel is changed from axial to lateral. This enables the pumping of the laser cavity uniformly and uniformly simultaneously, or in any desired traveling wave mode, over the entire length of the laser cavity with relatively short, and highly intense, electron pulses.

While a particular embodiment of the invention has been described and illustrated, modifications will become apparent to those skilled in the art, and it is intended to cover in the appended claims all such modifications as come within the spirit and scope of the invention.

What we claim is:

1. An apparatus for uniform pumping of a contained lasing media with short and intense electron pulses, comprising a linear electron accelerator for producing electron pulses, beam pipe means operatively connected to receive electron pulses from said linear electron accelerator, magnetic means operatively connected to said beam pipe means and to a vessel containing said lasing media for turning the electron pulse around a point where it moves laterally with respect to rather than axially parallel to said vessel containing said lasing media, guide coil means for wrapping electron trajectory of the thus produced pulses into tight spirals thereby slowing the forward velocity of the electrons traveling toward said lasing media, said guide coil means being positioned around said beam pipe means and said magnetic means, and window means positioned between said magnetic means and said vessel for admitting the electron pulses into said vessel which pump said lasing media contained in said vessel to an excited state creating a population inversion in said lasing media.

2. The apparatus defined in claim 1, wherein said magnetic means comprises a deflection magnet means and a bending magnet means positioned serially intermediate said beam pipe means and said vessel, said deflection magnet means being connected to receive electron pulses from said beam pipe means and direct same into said bending magnet means within which said pulses are turned essentially 90° emerging from said bending magnet means with a broad aspect profile and with a pulse front moving laterally with respect to rather than axially parallel to said vessel containing said lasing media.

3. The apparatus defined in claim 1, additionally including beam conduit means positioned intermediate said magnetic means and said vessel and surrounding said window means.

4. The apparatus defined in claim 1, wherein said linear electron accelerator has a longitudinal axis positioned at an angle in the range between about 5° and about 85° with respect to a longitudinal axis of said beam pipe means which causes the spatial extent of the apparatus to be reduced due to the reduced forward velocity of the electrons.

5. The apparatus defined in claim 1, wherein said vessel containing said lasing media has a longitudinal axis positioned substantially parallel with respect to a pulse front of said electron pulses such that said pulse front stricks said lasing media substantially simultaneously across the entire pulse front causing pumping of the lasing media uniformly and simultaneously throughout said vessel.

6. The apparatus defined in claim 1, wherein said vessel has a longitudinal axis positioned at an angle of up to about 20° with respect to a pulse front of said electron pulses such that said pulse front stricks said lasing media non-simultaneously across the entire pulse front causing pumping of the lasing media in a traveling wave mode over the length of said vessel.

7. The apparatus defined in claim 2, wherein said deflection magnetic means comprises a pulsed type deflection magnetic and means including switching circuitry for pulsing same.

8. The apparatus defined in claim 1, wherein said linear electron accelerator is positioned at an angle of 5° to 85° with respect to a longitudinal axis of at least a portion of said guide coil means.

9. The apparatus defined in claim 1, wherein said beam pipe means and said magnetic means have an interior under an atmosphere selected from the group consisting of suitable inert gases at low pressure and vacuum.

10. The apparatus defined in claim 1, additionally including beam conduit means positioned intermediate said magnetic means and said vessel and surrounding said window means, and means positioned about said beam conduit means for focussing and guiding said electron pulses to said window means.

* * * * *